(12) United States Patent
Kaes et al.

(10) Patent No.: US 8,972,173 B2
(45) Date of Patent: Mar. 3, 2015

(54) METHOD FOR DETERMINING THE LENGTH OF THE ROUTE TRAVELLED BY A VEHICLE

(75) Inventors: Katharina Kaes, Vienna (AT); Jasja Tijink, Breitenfurt (AT); Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 268 days.

(21) Appl. No.: 13/228,100

(22) Filed: Sep. 8, 2011

(65) Prior Publication Data

US 2012/0072108 A1 Mar. 22, 2012

(30) Foreign Application Priority Data

Sep. 17, 2010 (EP) .................................... 10450146

(51) Int. Cl.
*G01C 22/00* (2006.01)
*G07B 15/06* (2011.01)

(52) U.S. Cl.
CPC .............. *G01C 22/00* (2013.01); *G07B 15/063* (2013.01)
USPC ........... 701/416; 701/409; 701/446; 701/460; 701/521; 701/532; 340/460; 340/933; 340/988; 340/995.1; 340/990

(58) Field of Classification Search
CPC ........ G01C 21/30; G01C 21/26; G01C 21/32; G01S 19/42; G01S 19/47; G01S 19/22
USPC ................. 701/409, 446, 460, 521, 532, 533; 340/460, 933, 988, 995.1, 990
See application file for complete search history.

(56) References Cited

U.S. PATENT DOCUMENTS

| 5,874,905 | A  | * | 2/1999 | Nanba et al. ................ 340/995.2 |
| 5,899,954 | A  | * | 5/1999 | Sato .............................. 701/446 |
| 5,938,718 | A  | * | 8/1999 | Morimoto et al. ............ 701/431 |
| 6,185,496 | B1 | * | 2/2001 | Matsuno ......................... 701/70 |
| 6,208,927 | B1 | * | 3/2001 | Mine et al. ....................... 701/70 |
| 6,381,536 | B1 | * | 4/2002 | Satoh et al. .................... 701/431 |

(Continued)

FOREIGN PATENT DOCUMENTS

DE     696 23 069 T2    4/2003
DE  10 2004 030 709 A1  1/2006

(Continued)

OTHER PUBLICATIONS

Extended European Search Report for corresponding European Application No. 10 450 146.5, dated Mar. 10, 2011, 9pp.

*Primary Examiner* — John R Olszewski
*Assistant Examiner* — Truc M Do
(74) *Attorney, Agent, or Firm* — Fiala & Weaver P.L.L.C.

(57) ABSTRACT

A method for determining the length of the route travelled by a vehicle using a position measuring device that records positions of the vehicle and a digital road map, which is composed of road segments of known segment lengths. The method including recording positions of the vehicle on the route by means of the position measuring device, matching the recorded vehicle positions to a sequence of road segments, and determining the route length from the segment lengths of these road segments, wherein from the angle between at least two consecutive road segments and an assumed road width of the two road segments, a turn-off route of the vehicle from the one road segment into the other road segment is calculated. The calculated turn-off route is taken into consideration in the determination of the route length.

12 Claims, 2 Drawing Sheets

(56) References Cited

U.S. PATENT DOCUMENTS

| | | | |
|---|---|---|---|
| 6,459,387 B1* | 10/2002 | Kobayashi et al. | 340/988 |
| 6,577,334 B1* | 6/2003 | Kawai et al. | 348/148 |
| 7,344,288 B2* | 3/2008 | Kobayashi et al. | 362/466 |
| 7,653,484 B2* | 1/2010 | Choi | 701/412 |
| 2002/0065603 A1* | 5/2002 | Watanabe et al. | 701/207 |
| 2005/0253738 A1* | 11/2005 | Kobayashi et al. | 340/988 |
| 2006/0062482 A1* | 3/2006 | Adachi et al. | 382/242 |
| 2006/0184321 A1* | 8/2006 | Kawakami et al. | 701/209 |
| 2006/0229808 A1* | 10/2006 | Manabe | 701/210 |
| 2006/0293843 A1* | 12/2006 | Morita et al. | 701/207 |
| 2007/0010938 A1* | 1/2007 | Kubota et al. | 701/200 |
| 2007/0078594 A1* | 4/2007 | Mori | 701/207 |
| 2007/0225907 A1* | 9/2007 | Oonishi et al. | 701/209 |
| 2008/0091327 A1* | 4/2008 | Tsuchiya et al. | 701/93 |
| 2008/0114534 A1* | 5/2008 | Yamazaki et al. | 701/201 |
| 2008/0300783 A1* | 12/2008 | Miyajima et al. | 701/209 |
| 2009/0030599 A1* | 1/2009 | Kawauchi | 701/200 |
| 2009/0157566 A1* | 6/2009 | Grush | 705/400 |
| 2009/0216431 A1* | 8/2009 | Vu et al. | 701/201 |
| 2009/0240426 A1* | 9/2009 | Akita et al. | 701/201 |
| 2010/0161192 A1* | 6/2010 | Nara et al. | 701/70 |
| 2010/0324752 A1* | 12/2010 | Suganuma et al. | 701/1 |
| 2010/0332127 A1* | 12/2010 | Imai et al. | 701/208 |
| 2011/0125402 A1* | 5/2011 | Mitsugi et al. | 701/208 |
| 2011/0153200 A1* | 6/2011 | Tsuji et al. | 701/201 |

FOREIGN PATENT DOCUMENTS

| | | |
|---|---|---|
| DE | 10 2006 027 676 A1 | 12/2007 |
| EP | 0 789 225 A1 | 8/1997 |
| EP | 1 736 932 A1 | 12/2006 |

\* cited by examiner

METHOD FOR DETERMINING THE LENGTH OF THE ROUTE TRAVELLED BY A VEHICLE

CROSS-REFERENCE TO RELATED APPLICATION(S)

This application claims priority to European Patent Application No. 10 450 146.5, filed on Sep. 17, 2010, the contents of which are hereby expressly incorporated by reference.

FIELD OF THE INVENTION

The present invention relates to a method for determining the length of the route travelled by a vehicle using a position measuring device that records positions of the vehicle and a digital road map, which is composed of road segments of known segment lengths.

BACKGROUND

The measurement of the distance or length of route travelled (covered) by a vehicle is one of the bases of toll calculation in modern road toll systems that are based on digital map material. For this purpose, vehicle positions ("position fixes") determined by satellite navigation, for example, are matched to the road segments of the digital road map by "map matching" and the distance travelled is determined from the lengths thereof. However, this procedure is subject to a significant amount of inaccuracy, since it is based on idealised assumptions: the road segments of currently available digital road maps represent real roads in an idealised linear form for the purpose of simplifying and reducing the storage requirements. In this case, the segment lengths of the road segments are respectively defined between the intersection mid-points of the real roads.

SUMMARY

The applicants have recognised that a significant measurement error will accumulate if a vehicle does not follow these idealised intersection mid-points. Accordingly, the present invention uses the real road width and in particular takes inside or outside bends past the intersection mid-points. The invention is directed to a novel method that takes into consideration the imaging errors of idealised digital road map material and on the basis of this road map material allows a more accurate route length determination than the known methods.

In some embodiments, the invention calculates, from an angle between at least two consecutive road segments and an assumed road width of the two road segments, a turn-off route of the vehicle from said one road segment into said other road segment. The turn-off route is taken into consideration in the determination of the route length.

Working from idealised linear road segments of a digital road map, the method according to the invention calculates a realistic model of the road network by entering real turn-off routes at road intersections into the length determination for the first time. As a result, a significantly more accurate determination of the route covered by the vehicle can be obtained.

In some embodiments of the present invention, the at least one road segment represents a road with at least two lanes assigned to opposing directions of travel is distinguished in the calculation of the turn-off route to/from this road segment the turn-off route to/from the lane assigned to the direction of travel of the vehicle.

In some embodiments of the invention, at least one road segment representing a road with at least two lanes, of which at least one is assigned to a specific turn-off direction is distinguished in the calculation of the turn-off route to/from this road segment the turn-off route to/from the lane assigned to the turn-off direction of the vehicle. Thus, both variants take into consideration not only the position of the road segments relative to one another, but also the movement history ("track") of the vehicle for the selection and calculation of the turn-off route to be applied between road segments. The route length determination can thus be structured even more accurately.

In some embodiments of the invention, the turn-off route can be calculated approximately as a polygonal line resulting in a faster calculation time. Alternatively, the turn-off route can be calculated as an arc of a curve, which provides an even more accurate approximation of the real road parameters.

If the digital road map contains details concerning the road width, the details can be taken directly from the road map. However, a predetermined value may be assumed as the road width so that the method can be conducted on the basis of conventional road maps with linearly digitised roads.

In some embodiments, possible turn-off routes between road segments of the digital road map are pre-calculated and stored in a table, from which the respective turn-off route to be taken into consideration between two road segments is then taken. This enables the processing of the method to be accelerated.

Further embodiments of accelerating the method for real-time processing, for example in an OBU, a toll billing server, or a map matching server are comprised in one or more of the following:

a. a turn-off route between two road segments is only calculated and taken into consideration when the angle between these exceeds a predetermined minimum value;

b. the turn-off routes over the course of the travelled route are only calculated and taken into consideration when their count exceeds a predetermined minimum number or when their sum exceeds a predetermined minimum value;

c. no turn-off routes are calculated and taken into consideration between more than two consecutive road segments, between which angles lie that are respectively approximately equal, but alternate in their turn-off direction; and/or d. the turn-off routes are only calculated and taken into consideration for road segments in specific areas of the digital road map, preferably only in urban areas.

DETAILED DESCRIPTION

Figure 1:
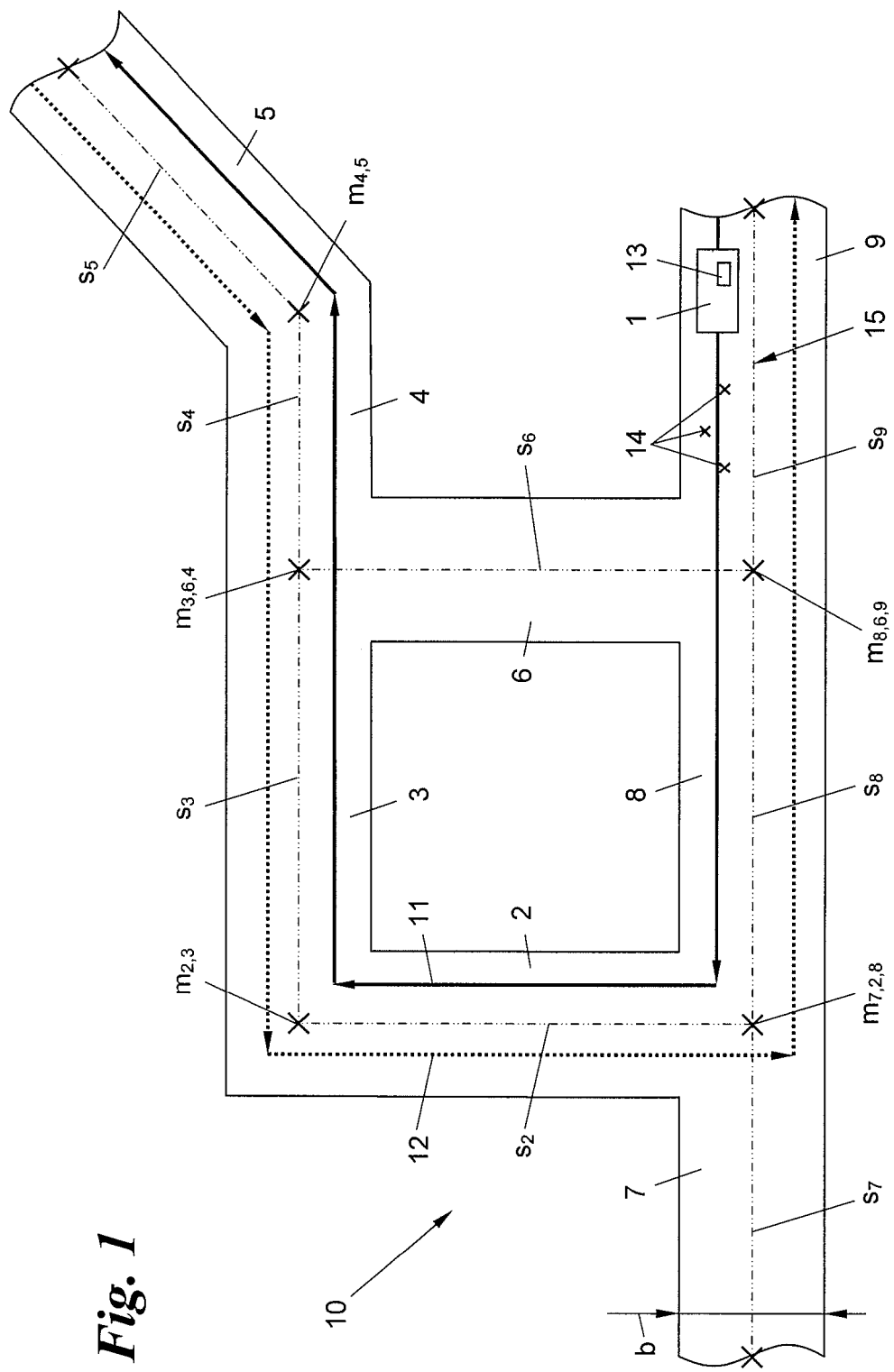
FIG. 1 shows sections of a road network modelled by a digital road map, in which vehicles travel exemplary routes, according to some embodiments of the present invention.

FIG. 1 shows a vehicle 1 that moves on exemplary roads 2-9 of a sectionally represented road network 10. Two possible routes that can be travelled by the vehicle 1 in the road network 10 are shown at 12 by a dotted line and at 11 by a bold line.

The vehicle 1 is equipped with an onboard unit (OBU) 13 that continuously determines its position—e.g. with the aid of satellite navigation or by other methods. Three exemplary vehicle positions ("position fixes") 14 are shown for illustration. The vehicle positions 14 are recorded by the onboard unit 13 or transmitted by this to a central control unit (not shown) of a road toll system to be recorded.

The road network 10 is modelled by a digital road map 15, which is stored e.g., in the OBU 13, in the control unit or a map matching server of the road toll system. The digital road map 15 comprises linear road segments $s_2$-$s_9$ (see dot-dash lines), which are respectively matched to roads 2-9 and represent these in an idealised linear form. It is understood that curved road courses can be represented by a polygonal-line-type sequence of road segments, as illustrated in the case of road segments $s_4$ and $s_5$.

The road segments $s_2$-$s_9$ are respectively defined in the digital road map 15 between junction or intersection midpoints $m_{2,7,8}$, $m_{8,9,6}$, $m_{2,3}$, $m_{3,6,4}$, $m_{4,5}$ etc. of the adjoining roads, i.e. without taking into consideration the width b of the roads 2-9. As a result, the distance (route length) covered (travelled) by the vehicle 1 on route 11 deviates in reality from the mere sum of the segment lengths of the road segments $s_9$, $s_8$, $s_2$, $s_3$, $s_4$ and $s_5$, as can be seen from FIG. 1. The behaviour is the same with the exemplary return route 12.

Figure 2:
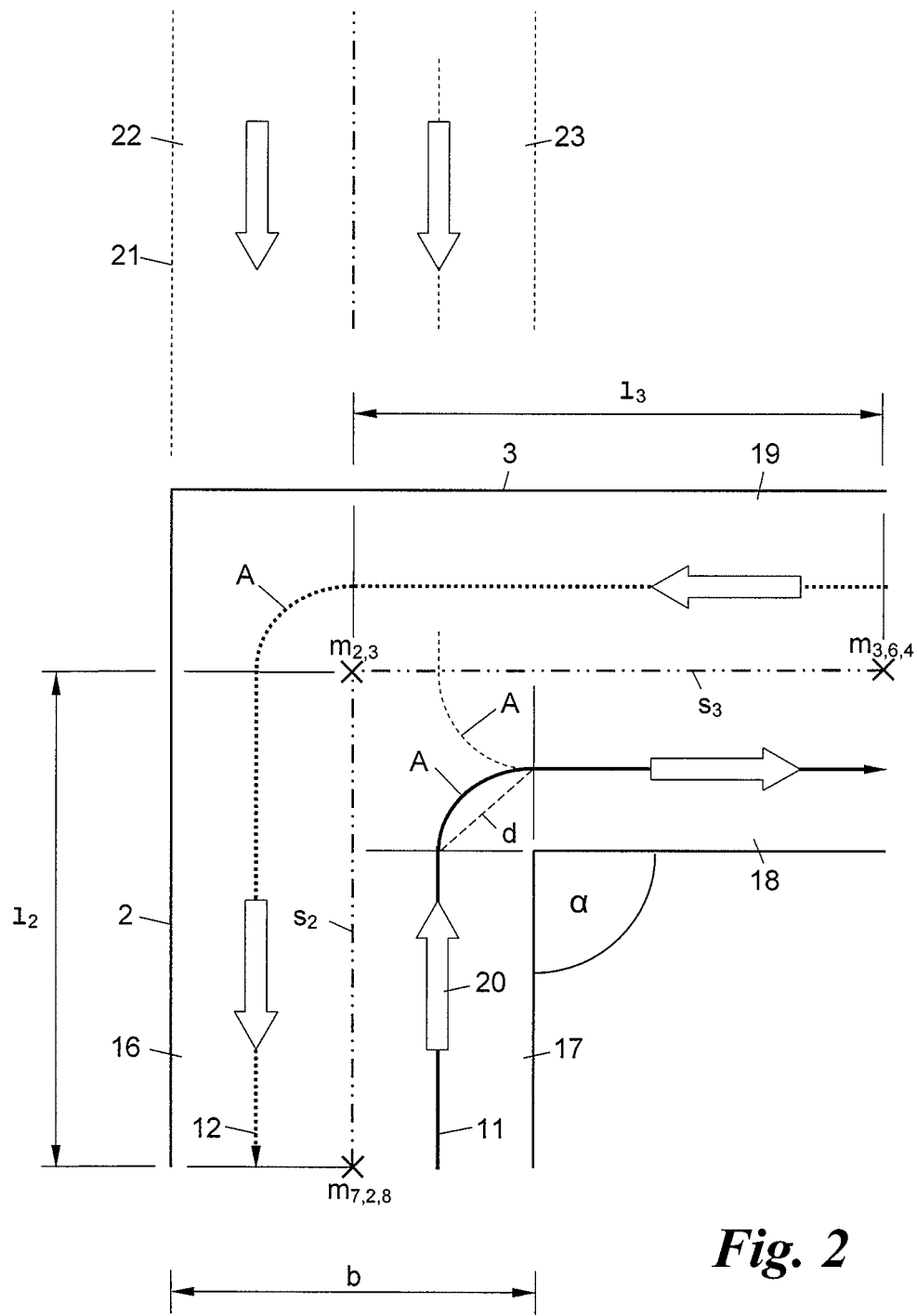
FIG. 2 shows in detail the method of the invention for determining the route lengths covered at a turn off in a road network, according to some embodiments of the present invention.

In the case of two-lane roads, as shown in FIGS. 1 and 2, the deviation between the length of the route 11 or 12 and the length of the road segments $s_9$, $s_8$, $s_2$, $s_3$, $s_4$ and $s_5$ is dependent not only on the turn-off routes of the vehicle 1 when turning from one road segment into the next, but also on the direction of travel of the vehicle 1, since individual lanes 16-19 of the roads 2-9 can be assigned to specific travel and/or turn-off directions 20. FIG. 2 shows this in detail on the basis of the exemplary intersection $m_{2,3}$ of roads 2, and their road segments $s_2$, $s_3$.

The length L' of the route covered when turning off from road 2 into road 3 determined from the road map 15 would be $$L' = l_2 + l_3 \quad (1)$$

where:
$l_2$ is the segment length of road segment $s_2$ of the digital road map 15 for road 2 and
$l_3$ is the segment length of road segment $s_3$ of the digital road map 15 for road 3.

Taking into consideration an assumed width b≠0 of roads 2, 3 e.g. of 6 m and an angle α≠0 between the two roads 2, 3 or road segments $l_2$ and $l_3$, the length L' is to correct the respective turn-off route A of the vehicle 1—e.g., when turning off from road 2 into road 3. The actual or real length L can be set at $$L_{corr} = l_2 + l_3 + A \quad (2)$$

where
A is the length of the turn-off route as correction term, i.e. positive in the case of lanes 16, 19 on the outside of the bend and negative in the case of lanes 17, 18 on the inside of the bend.

For example, if the turn-off route A is approximated as the arc of a curve, both roads 2, 3 have the same width b and the angle α amounts to 90°, for example, then the turn-off route A on the "inside bend" is $$A = \frac{\pi}{8}b - b \quad (3)$$

and on the "outside bend" is $$A = \frac{\pi}{8}b \quad (4)$$

If the roads 2, 3 do not have the same predetermined width b, for example, if these can be taken separately from the digital road map 15 for each road segment $s_2$, $s_3$ or for specific types of road segments such as trunk roads, major and minor roads, the turn-off route A can be approximated, for example, as an arc of an ellipse. Other types of curve arc approximations, e.g. typical steering radii of vehicles, can be assumed and taken into consideration.

In simplified embodiments the turn-off route A could also be merely approximated by a polygonal line, e.g. by the shown diagonal d. With an angle α=90° and a constant road width b for the inside bend (−) or outside bend (+) the turn-off route A would then be $$A = \left(\frac{1-\sqrt{2}}{2\sqrt{2}} \pm \frac{1}{2}\right)b \quad (5)$$

For turn-off angles α other than 90° the turn-off route A can be calculated in the same way by corresponding trigonometry.

As shown in FIGS. 1 and 2, particularly in the case of multilane roads, in which the lanes 16-19 are respectively assigned to a specific direction of travel 20, the turn-off route A is dependent on the respective direction of travel 20 of the vehicle 1. In the case of roads 21 with multiple lanes 22, 23 in the same direction of travel, of which e.g. one lane 23 is assigned to a specific turn-off direction, as here lane 23 for the left turn-off into lane 18, a corresponding turn-off route A can be taken into consideration in the same way.

It is also possible in principle to pre-calculate all possible turn-off routes A in a road network 10 between roads 2-9, i.e. road segments $s_2$-$s_9$ of the digital road map 15, and store them in a table of a data bank of the OBU, the toll billing server and/or a map matching server. Such a table can be added to the digital road map 15, for example, and can even be distributed with the map. When determining the route length L, it is possible on the basis of the road segments $s_2$-$s_9$ used by the vehicle 1 to take the respective turn-off routes A to be applied between these segments from the pre-calculated table and take these into consideration.

Further optional possibilities for an acceleration or simplification of the method in offline or online ("real time") implementations include:

a turn-off route A between two road segments $s_2$-$s_9$ is calculated and taken into consideration when the angle α between these exceeds a predetermined minimum value;

the turn-off routes A over the course of the travelled route 11, 12 are calculated and taken into consideration when they exceed a predetermined minimum number or the sum thereof exceeds a predetermined minimum value;

no turn-off routes A are calculated and taken into consideration between more than two consecutive road segments $s_2$-$s_9$, between which angles a lie that are respectively approximately equal, but alternate in their turn-off direction; and/or the turn-off routes A are calculated and taken into consideration for road segments $s_2$-$s_9$ in specific areas of the digital road map 15, preferably only in urban areas.

The outlined method for determining route length can be applied in any suitable processing point of a road toll system, e.g. in OBUs, which have their own stored road map material 15 and determine the covered route length L therefrom; or in central toll billing servers, which obtain raw position data (position fixes or tracks) from OBUs and match these to a digital road map 15 (map matching); or in separate map matching server farms, which conduct the computer-bound map matching for OBUs or toll control units.

Consequently, the invention is not restricted to the represented embodiments, but covers all variants and modifications that fall within the framework of the attached claims.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for determining a length of a route travelled by a vehicle using a position measuring device that records positions of the vehicle, and a digital road map including road segments of known segment lengths, the method comprising:

recording positions of the vehicle on the route by the position measuring device;

matching the recorded vehicle positions to a sequence of road segments travelled by the vehicle, by a processor;

calculating by a processor, from an angle between two consecutive travelled road segments of said sequence of road segments and an assumed road width of the two consecutive travelled road segments, a turn-off route length travelled by the vehicle from the first consecutive travelled road segment into the second consecutive travelled road segment of the two consecutive travelled road segments; and determining the length of the route travelled by the vehicle from segment lengths of the sequence of road segments travelled by the vehicle, and the calculated turn-off route length travelled by the vehicle.

2. The method according to claim 1, wherein at least one road segment of the digital road map represents a road with at least two lanes assigned to opposing travel directions, and wherein calculating a turn-off route comprises calculating a turn-off route to/from a lane assigned to the direction of travel of the vehicle.

3. The method according to claim 1, wherein at least one road segment of the digital road map represents a road with at least two lanes, of which at least one lane is assigned to a specific turn-off direction, wherein calculating a turn-off route length comprises calculating a turn-off route to/from a lane assigned to the turn-off direction of the vehicle.

4. The method according to claim 3, wherein the turn-off route length is calculated as a polygonal line.

5. The method according to claim 3, wherein the turn-off route length is calculated as an arc of a curve.

6. The method according to claim 1, wherein the assumed road width is taken from the digital road map.

7. The method according to claim 1, wherein a predetermined value is assumed as the assumed road width.

8. The method according to claim 1, wherein possible turn-off route lengths between road segments of the digital road map are pre-calculated and stored in a table, from which the respective turn-off route lengths to be taken into consideration between the two consecutive travelled road segments is then taken.

9. The method according to claim 1, wherein a turn-off route length between two consecutive travelled road segments is calculated and taken into consideration in determining the route length, when the angle between the two consecutive travelled road segments exceeds a predetermined value.

10. The method according to claim 1, wherein turn-off route lengths over the course of the travelled route are calculated and taken into consideration in determining the length of the route travelled by the vehicle, when a number of the turn-off route lengths exceeds a predetermined number, or when a sum of the turn-offs exceeds a predetermined value.

11. The method according to claim 1, wherein no turn-off route lengths are calculated and taken into consideration in determining the length of the route travelled by the vehicle between more than two consecutive road segments with approximately equal angles alternating in respective turn-off direction.

12. The method according to claim 1, wherein the turn-off route lengths are only calculated and taken into consideration in determining the length of the route travelled by the vehicle, for travelled road segments in specific areas of the digital road map in urban areas.

* * * * *